United States Patent
Morinaga et al.

(10) Patent No.: US 7,508,337 B2
(45) Date of Patent: Mar. 24, 2009

(54) RADAR APPARATUS AND SIGNAL PROCESSING METHOD

(75) Inventors: Mitsutoshi Morinaga, Kokubunji (JP); Keiichiro Nagatsuka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/979,222

(22) Filed: Oct. 31, 2007

(65) Prior Publication Data
US 2008/0122680 A1 May 29, 2008

(30) Foreign Application Priority Data
Nov. 24, 2006 (JP) ............................. 2006-316978

(51) Int. Cl.
*G01S 13/42* (2006.01)
(52) U.S. Cl. ................... 342/109; 342/70; 342/112; 342/128; 342/129; 342/130
(58) Field of Classification Search ............ 342/70–72, 342/109–112, 128–132, 134–136
See application file for complete search history.

(56) References Cited

U.S. PATENT DOCUMENTS

| | | | |
|---|---|---|---|
| 3,149,326 A | | 9/1964 | Naidich |
| 5,270,720 A * | | 12/1993 | Stove .......................... 342/174 |
| 5,325,097 A | | 6/1994 | Zhang et al. |
| 5,361,072 A * | | 11/1994 | Barrick et al. ............... 342/133 |
| 5,481,504 A * | | 1/1996 | Rosenbach et al. .......... 367/101 |
| 5,963,163 A | | 10/1999 | Kemkemian et al. |
| 6,404,381 B1 | | 6/2002 | Heide et al. |
| 2008/0100500 A1* | | 5/2008 | Kondoh ....................... 342/109 |
| 2008/0122680 A1* | | 5/2008 | Morinaga et al. ........... 342/109 |
| 2008/0129582 A1* | | 6/2008 | Hsieh et al. .................. 342/94 |

FOREIGN PATENT DOCUMENTS

| | | |
|---|---|---|
| DE | 4114974 A1 * | 11/1992 |
| DE | 103 49 919 A1 | 10/2003 |
| EP | 1 619 519 A1 | 9/2001 |
| GB | 2172461 A * | 9/1986 |
| JP | 10-253753 | 3/1998 |
| JP | 2004-151022 | 10/2002 |
| JP | 2008058165 A * | 3/2008 |
| JP | 2008128946 A * | 6/2008 |
| WO | WO 9211543 A1 * | 7/1992 |
| WO | WO 03/048802 A2 | 11/2002 |
| WO | WO 03/048802 A3 | 11/2002 |

OTHER PUBLICATIONS

Extended European Search Report dated Mar. 12, 2008 regarding Application No. 07021216.2-2220.

* cited by examiner

*Primary Examiner*—John B Sotomayor
(74) *Attorney, Agent, or Firm*—Reed Smith LLP; Juan Carlos A. Marquez, Esq.

(57) ABSTRACT

The radar apparatus of the present invention can obtain distance to a target and speed with higher accuracy even when multiple targets are running within a detecting field of a radar. The radar apparatus can transmit a radio wave by alternately switching a section having a frequency slope and a section having no frequency slope with the radar for simultaneously transmitting a couple of frequencies having a frequency difference. Measurement of distance to the target and relative speed is conducted in the above two sections, results of measurement are compared with each other in the adjacent sections, and the result of measurement is determined correct only when there is no inconsistency in these measurement results.

19 Claims, 18 Drawing Sheets

RADAR APPARATUS AND SIGNAL PROCESSING METHOD

CLAIM OF PRIORITY

The present invention claims priority from Japanese application JP2006-316978 filed on Nov. 24, 2006, the content of which is hereby incorporated by reference into this application.

FIELD OF THE INVENTION

The present invention relates to a radar apparatus for detecting a target such as obstacles using a continuous radio wave and a signal processing method, for example, a radar apparatus suitable for measuring in higher accuracy both location of an object to be detected such as a preceding vehicle or the like and a relative speed to the own vehicle (a radar carrier vehicle) and a signal processing method.

BACKGROUND OF THE INVENTION

A radar apparatus utilizing a millimeter wave is well known as an apparatus for measuring, when a vehicle is running, the distance to an obstacle or a preceding vehicle. The radar apparatus radiates a radio wave and receives the radio wave reflected from an target such as an obstacle and a vehicle. This radar apparatus detects the intensity of reflected wave received, Doppler shift of frequency, and a propagation time up to reception of the reflected wave from radiation of the radio wave and measures a distance to the target and a relative speed from the result of detection.

Several systems are provided for radar modulation used for the purpose explained above, and the typical methods are FMCW (Frequency Modulated Continuous Wave) system and two-frequency CW (Continuous Wave) system.

Japanese Patent Laid-Open No. H10-253753 discloses a radar system and a radar apparatus for obtaining a distance and a speed of a target as a function of phase difference of a receiving signal corresponding to each ramp by sending alternately at least two kinds of parallel and non-continuous frequency modulation ramps.

Moreover, Japanese Patent Laid-Open No. 2004-151022 discloses an FMCW system and an FMCW apparatus employing a frequency pattern giving two or more frequency slopes to a transmitting wave.

SUMMARY OF THE INVENTION

Recently, a constant speed running apparatus for vehicles and a vehicle-to-vehicle distance control apparatus have been developed and put into the practical use, which implement running control on the basis of result of detection by mounting a radar apparatus into a vehicle to detect an obstacle or a preceding vehicle.

Several systems have been proposed for radar modulation used for this purpose, and the typical systems include an FMCW (Frequency Modulated Continuous Wave) system and a two-frequency CW (Continuous Wave) system.

FIG. 17 shows an example of transmitting and receiving a frequency pattern in the FMCW system. In this case, a radio wave that is modulated in the manner that frequency linearly increases or decreases upward and downward in accordance with passage of time. A distance to the target and a relative speed are obtained on the basis of the processes explained below from a frequency of a beat signal obtained by receiving the returning radio wave reflected by a target and then mixing the transmitting and receiving signals. In FIG. 17, a transmitting wave (Tx) is indicated with a solid line, while a receiving signal (Rx) is indicated with a broken line.

The returning receiving signal reflected by the target is delayed as much as the time required by the radio wave to go to and return from the target, namely the time $\tau = 2R/c$ (c: speed of light) proportional to the distance R to the target. Moreover, this receiving signal includes the Doppler shift as much as the frequency $f_d = -2Vf/c$ (f: frequency of transmitting wave) proportional to a relative speed V for the target.

Here, as a sign of the relative speed V, the direction in which an object becomes far from a radar is defined as positive.

Following equation (1) may be attained under the condition that a frequency of a beat signal (hereinafter referred to as beat frequency) obtained in a section where a transmitting frequency becomes higher is $f_{bU}$, a beat frequency obtained in a section where the transmitting frequency becomes lower is $f_{bD}$, and a frequency difference based on a delay time is $f_r$.

$$f_{bU} = f_r - f_d$$

$$f_{bD} = f_r + f_d \qquad (1)$$

Here, $f_r$ is proportional to distance R and $f_d$ is proportional to relative speed V. Therefore, distance R and relative speed V can be obtained by solving the equation (1) for $f_r$ and $f_d$.

However, a problem rises here. Namely, distance and relative speed cannot be measured accurately in the FMCW system for a target that is moving in higher speed in the near distance. In order to solve this problem, Japanese Patent Laid-Open No. 2004-151022 discloses the contents to use a transmitting wave in which the absolute value of the frequency variation is changed.

Moreover, in the FMCW system, the beat signal must be determined first whether it is based on the reflected signal of the same target for the beat signal measured in the section where the transmitting wave frequency is being increased and the beat signal measured in the section where the transmitting wave frequency is being lowered. When a plurality of targets exist, such determination is difficult and if the determination has failed, erroneous data showing that the target exists in the position where the target does not actually exist is likely to be outputted.

Next, in two-frequency CW system, a couple of frequencies $f_1$, $f_2$ are transmitted through switching these radio waves. Like the FMCW system, beat signals may be obtained respectively for these two transmitting signals $f_1$, $f_2$ by receiving the reflected wave returned from the target. Frequency of the beat signal measured from the data obtained in the section where the frequency $f_1$ is transmitted is equal to the Doppler shift $f_d = -2Vf_1/c$ proportional to the relative speed V for the target. Therefore, the relative speed V is determined with the equation (2).

$$V = -f_d \times c/(2 \times f_1) \qquad (2)$$

Since the receiving wave is transmitted twice for the distance R up to and from the target, a phase of the receiving wave is different from the phase of the transmitting wave when the receiving wave is received. An equation (3) may be obtained when a phase difference measured from the data obtained in the section where the frequency $f_1$ is transmitted is $\Delta\phi_1$ and a phase difference measured from the data obtained in the section where the frequency $f_2$ is transmitted is $\Delta\phi_2$.

$$\Delta\phi_1 - \Delta\phi_2 = 4\pi R \times (f_1 - f_2)/c \qquad (3)$$

Accordingly, distance to the target can be obtained by solving the equation (3) for R.

It is known that a problem in two-frequency CW system lies in the following point.

First, a beat signal cannot be detected and a target cannot be detected because the Doppler shift is not generated for the target having no relative speed for the radar.

Moreover, in the case where a plurality of targets having the equal relative speed exist, these targets cannot be separately detected because the reflected signals are measured as the same beat frequency.

As a means for solving such problems, Japanese Patent Laid-Open No. H10-253753 discloses the radar system giving a frequency slope to the transmitting wave in two-frequency CW system. This system will be called hereunder as a two-frequency ramp system.

According to this two-frequency ramp system, when a target having no relative speed to the radar exists, for example, the frequency of receiving wave returned after reflection from the target is different from the frequency of the radio wave transmitted when such receiving signal is received. Therefore, a beat frequency corresponding to the distance up to the target can be measured by mixing the transmitting and receiving signals. Moreover, distance to the target and relative speed can be obtained with the arithmetic operations almost identical to that in two-frequency CW system.

In addition, even when a plurality of targets having the equal relative speed exist, the beat frequency of these target is different when distance to the target is different. Distance to the target and relative speed can also be obtained with the arithmetic operations almost identical to that in two-frequency CW system.

The problem in utilization of two-frequency ramp system explained above will then be explained with reference to FIG. 18. FIG. 18 shows an example of a relationship of distance to the other vehicle (target) to be detected viewed from a vehicle that is carrying a radar and running at the speed Vi and a relative speed between these vehicles. A beat frequency of the receiving signal returned after reflection by the vehicle (target) to be detected is detected with the radar mounted on the own vehicle.

In the distance-relative speed plane shown in FIG. 18, when the other target satisfying the condition of distance and relative speed shown by a straight line 5 exits, the beat frequency thereof overlaps that of the vehicle (target) to be detected. Here, slope of the straight line 5 is determined by the slope of the transmitting frequency for the time axis. If such situation is generated, it is impossible to separately detect the vehicle (target) to be detected and an object satisfying the condition of straight line 5.

For example, under the condition that an iron fence is installed in the side of a road as shown in FIG. 8, distance and relative speed to the fence satisfy the conditions indicated by a chain straight lines 6 and the straight line 5 crosses the chain line 6. Therefore, a beat signal to be detected is generated by a composite wave of the reflected waves by the vehicle (target) and the fence. In this case, it is impossible to obtain an accurate phase difference $\Delta\phi_1 - \Delta\phi_2$ of the reflected wave by the vehicle (target) and measured distance includes a large error.

This corresponds to that a plurality of targets in the identical relative speed cannot be separately detected in two-frequency CW system. Namely, in the case of two-frequency CW system, the straight line 5 in FIG. 18 is parallel to the horizontal line and distance to be measured includes a large error when the plurality of targets satisfying the conditions exist.

Moreover, the transmitting wave always having a constant frequency slope must be radiated in two-frequency ramp system. However, if such slope is deviated, for example, due to temperature change, measuring accuracy is deteriorated because a beat frequency is also deviated in accordance with such deviation.

The present invention has been proposed to address the problems explained above. The principal problem to be solved of the present invention is to provide a radar apparatus and a signal processing method for obtaining distance and speed of a target with higher accuracy, even if targets other than the target to be measured exist within a detection sight of the radar.

According to a profile of the present invention, the present invention includes, in order to address the problems explained above, a signal generating unit, a transmitting unit, a receiving unit, and a receiving signal processor. In the radar apparatus of the present invention, a transmitting signal generated with the signal generating unit and radiated from the transmitting unit including, within a unit modulating section, a first modulating section on the time axis for transmitting a radio wave in accordance with at least a couple of sweep frequency straight lines having frequency slopes for the time axis with periodical switching transition, and a second modulating section on the time axis for transmitting the radio wave in accordance with at least a couple of sweep frequency straight lines having no frequency slope for the time axis with the periodical switching transition; and the signal processing unit has a function for obtaining at least one of distance to a target or a relative speed by processing a reflected wave of the transmitting signal reflected by the target and received with the receiving unit.

According to the present invention, even if a large error is included in a measurement result in any of the first modulating section and the second modulating section under the situation that a plurality of targets exist, correct and erroneous measurement results can be verified with measurement in one modulating section. Accordingly, output of erroneous detected data can be reduced.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE PREFERRED EMBODIMENTS

According to the preferred embodiments of the present invention, a radar for transmitting tow or more frequencies including frequency differences utilizes a modulating system for alternately repeating a section (first modulating section) having a frequency slope and a section (second modulating section) having no frequency slope. In these two modulating sections, distance to a target and a relative speed can be measured independently. The preferred embodiments of the present invention are provided with a signal processor that judges that a result is correct only when there is no inconsistency by comparing results of measurements between adjacent modulating sections.

Here, a comparing method for result of measurement is subjected, for example, to the following processes. For example, when a target is detected in the first modulating section at a certain time, a beat frequency to be measured in the second modulating section can be deduced from a measured distance. In the case where such beat frequency is actually detected in the second modulating section, distance measured in the first modulating section is judged correct.

This judging method uses a feature of two-frequency CW system and two-frequency ramp system that a measuring error of beat frequency is small. That is, in the case of the above example, if an error of distance measured in the first modulating section is large, an error of beat frequency that can be assumed to be detected in the second modulating section is also large. Meanwhile, since an error of beat frequency actually detected in the second modulating section is small, difference from a deduced value becomes large and thereby distance measured in the first modulating section is judged large. Output of erroneously detected data can be diminished by canceling such measured distance value.

As explained above, output of erroneously detected data can be limited and reliability of distance and speed to be outputted can be improved by providing two kinds of modulating section and verifying "right" or "wrong" of measurement results in both modulating section. The radar apparatus of the present invention outputs only highly reliable information and is suitable for use in a vehicle constant speed running apparatus and a vehicle-to-vehicle distance control apparatus that can implement running control on the basis of a result of detection of an obstacle or a preceding vehicle.

The preferred embodiments of the present invention assuming installation of the radar apparatus into a vehicle will be explained with reference to the accompanying figures.

Application field of the radar apparatus of the present invention is not limited only to a vehicle. For example, it can also be used as a monitoring system for watching a suspicious person or an invading person through installation within a house.

First Embodiment

A first embodiment of the present invention will be explained with reference to FIG. 1 to FIG. 9.

Figure 1:
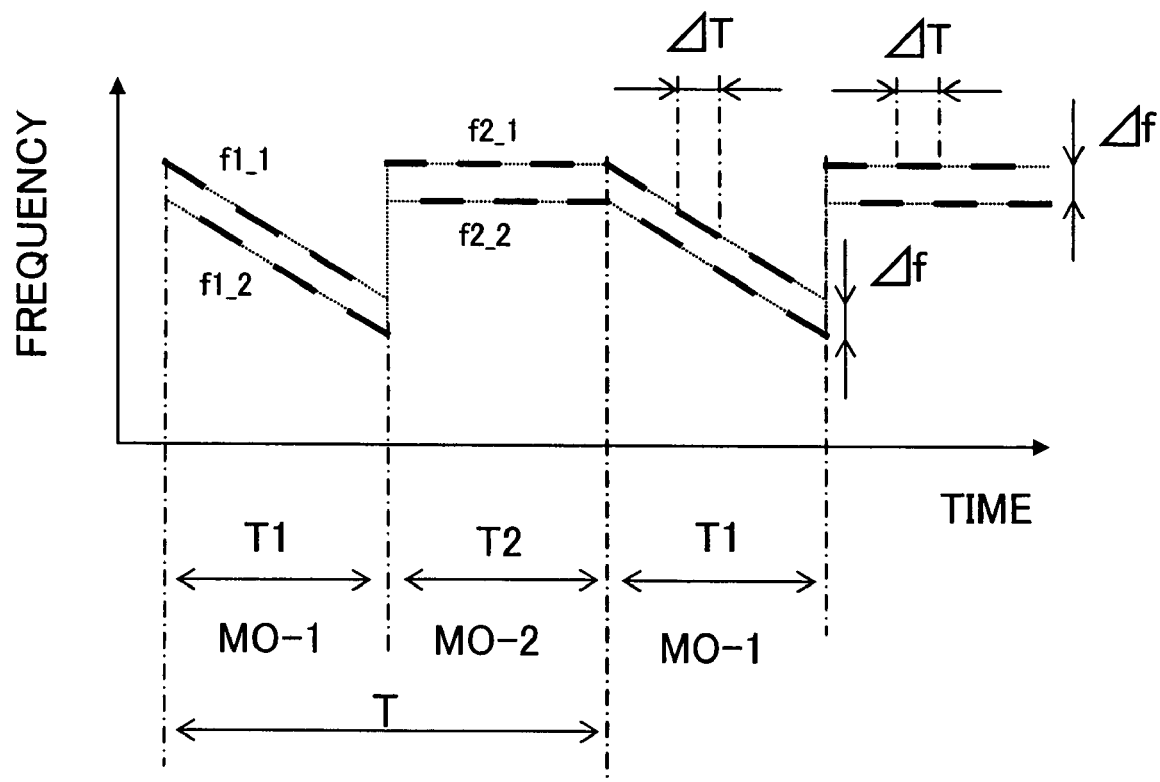
FIG. 1 shows a transmitting frequency pattern of a radar apparatus according to a first embodiment of the present invention.

FIG. 1 is a graph showing frequency modulation of a transmitting wave in a radar system according to a first embodiment of the present invention.

As shown in FIG. 1, according to the frequency modulation system of transmitting wave in this first embodiment, a couple of frequencies having a frequency difference $\Delta f$ in the period of time $\Delta T$ are alternately transmitted. Moreover, a section (first modulating section=MO-1) having a negative frequency slope in a time interval T1 larger than a time interval $\Delta T$ and a section (second modulating section=MO-2) having no frequency slope in the time interval T2 larger than $\Delta T$ are alternately repeated. A unit modulating section (time interval T) is formed with the first modulating section (MO-1) and the second modulating section (MO-2) and a couple of sweep frequency straight lines transmitted in the first modulating section are defined as $f_{1\_1}$ and $f_{1\_2}$ and a couple of frequency strait lines transmitted in the second modulating section as $f_{2\_1}$, $f_{2\_2}$. In this embodiment, the sweep frequency straight lines $f_{1\_1}$ and $f_{1\_2}$ having a negative frequency slope are used for explanation, but such lines may have a positive frequency slope.

According to this embodiment, during the first modulating section (MO-1), the transmitted signal alternately stays on either one of the couple of sweep frequency straight lines $f_{1\_1}$ and $f_{1\_2}$ for the first time $T_1$ expressed as the thick line, and during the second modulating section (MO-2), the transmitted signal alternately stays on either one of the couple of sweep frequency straight lines $f_{2\_1}$, and $f_{2\_2}$ for the second time $T_2$ expressed as the thick line. In this way, the frequency of the transmitted signal changes for the fixed time T (time interval T) while the frequency is periodically and digitally switched along the four frequency sweep straight lines.

In order to simplify the explanation, $f_{1\_1}$, $f_{1\_2}$ are repeated only for three periods in the first modulating section in FIG. 1, but these are actually repeated for more periods in each modulating section.

Figure 2:
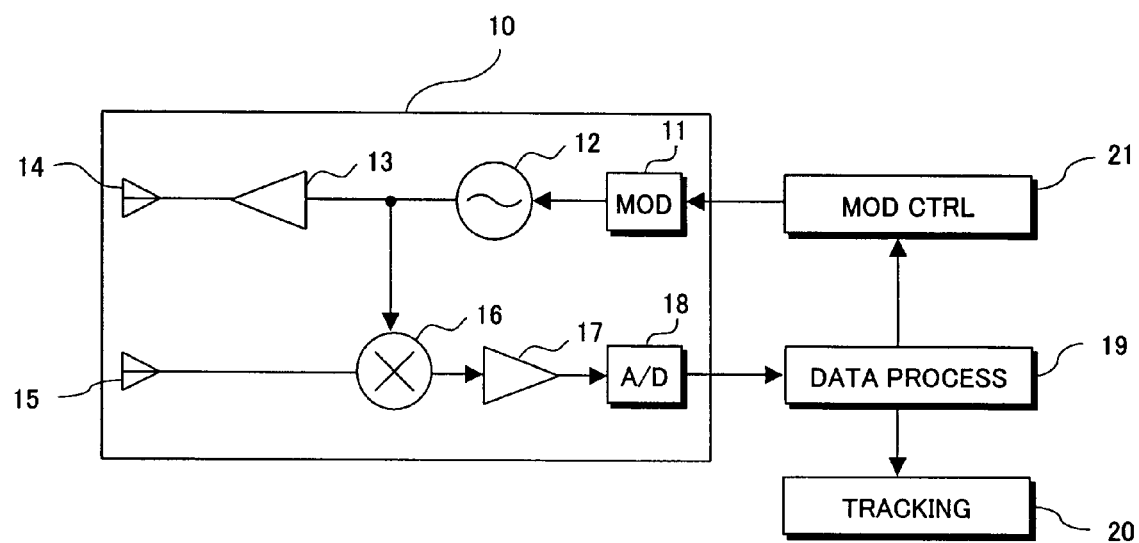
FIG. 2 is a block diagram showing a circuit structure according to the first embodiment of the present invention.

FIG. 2 is a block diagram showing an example of structure of the radar apparatus to realize this embodiment. The radar apparatus is provided with a signal generator, a transmitting unit as the transmitting system and a receiving unit and a receiving signal processor as the receiving system. An analog circuit 10 of the radar apparatus is provided with a signal generator (a modulator 11, an oscillator 12) and a transmitting unit (a power amplifier 13, a transmitting antenna 14) or the like in the transmitting system and a receiving unit (a receiving antenna 15, a mixer circuit 16, a power amplifier 17, an A/D converter 18) in the receiving system. The receiving system further includes a receiving signal processor 19 for processing a signal outputted from the A/D converter 18 and a tracing processing unit 20 for tracking process by receiving an output of the receiving signal processor 19. And the transmitting system is provided with a modulation control unit 21.

As the oscillator 12, a voltage-controlled oscillator for generating ultra-high frequency signal such as millimeter wave by changing oscillation frequency in accordance with a control voltage $V_{cont}$ applied to a frequency modulation terminal of the oscillator. A modulator 11 of the signal generating unit outputs the control voltage $V_{cont}$ for oscillating the oscillator 12 in accordance with the frequency pattern shown in FIG. 1. The modulation control unit 21 controls the control voltage $V_{cont}$ outputted from the modulator 11 control the oscillator 12 output a modulating signal of the predetermined frequency pattern irrespective of fluctuation in the manufacturing processes and change in usage environment such as temperature. As explained above, the oscillator 12 oscillates in the frequency pattern shown in FIG. 1.

A high frequency signal is amplified with the power amplifier 13 and is then radiated toward a monitoring domain as the transmitting wave from the transmitting antenna 14. The radio wave transmitted from the transmitting antenna 14 is reflected with a target in the irradiation domain and the returning radio wave is received with the receiving antenna 15. This receiving signal is mixed with a transmitting signal within the mixer 16 to generate a beat signal. This beat signal is outputted to the power amplifier 17. A signal amplified and outputted from the power amplifier 17 is converted into a digital signal with an A/D converter 18 and then sent to a receiving signal processor 19.

The receiving signal processor 19 is provided with an arithmetic processor such as DSP (Digital Signal Processor). This processing unit 19 has a speed and distance computing function for obtaining a relative speed between the radar and target and distance to the target by executing processes of the digital signal using an arithmetic processing program on the basis of the predetermined function equation for the signal obtained by receiving the transmitting signal as the signal reflected with the target with the receiving unit and by conversion thereof into a digital signal. Moreover, the receiving signal processor 19 is also provided with a result determining function for determining whether the detection result is correct or not by comparing a measured value in one modulating section with a measured value in the other modulating section for the reflected wave having the modulation waveform covering the first modulating section and the second modulating section.

A part of the speed and distance calculating processes conducted by the signal processor 19 will be explained with reference to FIG. 3 to FIG. 9.

The principle for measuring distance R to the target and a relative speed of target in the first modulating section will be explained first.

When the target exists in the distance R, a difference between a phase $\Delta\phi_{1\_1}$ of a beat signal measured from the data obtained in the section from which the frequency $f_{1\_1}$, is transmitted and a phase $\Delta\phi_{1\_2}$ of a beat signal measured from the data obtained in the section from which the frequency $f_{1\_2}$ is transmitted can be indicated by an equation (4).

$$\Delta\phi_{1\_1} - \Delta\phi_{1\_2} = 4\pi R \times (f_{1\_1} - f_{1\_2})/c \qquad (4)$$

Accordingly, distance R can be obtained from an equation (5) for solving the equation (4) for R.

$$R = c \times (\Delta\phi_{1\_1} - \Delta\phi_{1\_2})/4\pi(f_{1\_1} - f_{1\_2}) \qquad (5)$$

For measurement of relative speed, frequency of the beat signal is used. The frequency ($f_{b1\_1}$) of the beat signal measured from the data obtained in the section generating the frequency $f_{1\_1}$ is equal to a sum of the Doppler shift $f_d = -2Vf_{1\_1}/c$ proportional to the relative speed for the target and a frequency shift $ft = -2Rf'_{1\_1}/c$ proportional to a delay time $\tau = 2R/c$ until reception of the receiving wave and it can be indicated by the equation (6). Here, $f'_{1\_1}$ indicates slope of the sweep frequency straight line $f_{1\_1}$.

$$f_{b1\_1} = -2Vf_{1\_1}/c - 2Rf'_{1\_1}/c \qquad (6)$$

A relative speed between the target and the radar can be obtained from the equation (7) by solving the equation (6) for relative speed V.

$$V = -c \times f_{b1\_1}/2f_{1\_1} - Rf'_{1\_1}/f_{1\_1} \qquad (7)$$

Next, the principle for measuring distance to the target and relative speed of target in the second modulating section will be explained. A relative speed can be computed from the equation (8) as in the case of two-frequency CW system in the second modulating section.

$$V = -c \times f_{b2\_1}/2f_{2\_1} \qquad (8)$$

Distance can be obtained from the equation (5).

As explained above, distance to the target and relative speed can be measured independently and these can be computed whenever the first modulating section and the second modulating section are completed.

Next, processes required until results of measurement in two modulating sections are outputted to the tracking process will be explained with reference to FIG. 5, FIG. 6, and FIG. 8, focusing on the flowcharts of FIG. 3 and FIG. 4.

Figure 8:
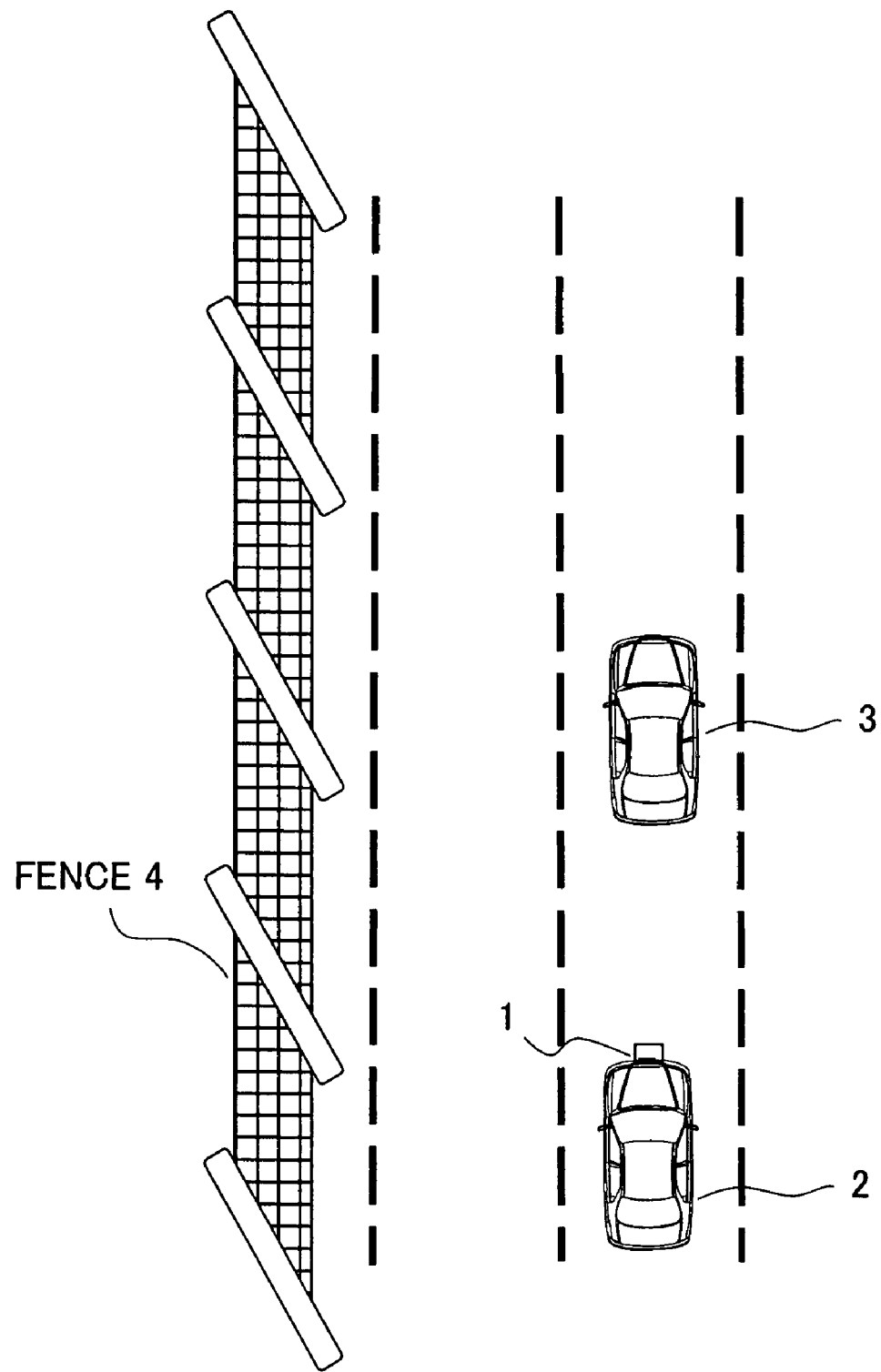
FIG. 8 shows a positional relationship among a radar carrying vehicle, a vehicle to be detected, and a fence at the side of a road.

FIG. 8 shows a positional relationship among a vehicle carrying a radar, a vehicle to be detected, and a fence installed in the side of a road, and the vehicle 2 carrying the radar 1 (own vehicle) is running at the speed Vi. The preceding vehicle 3 is a target to be measured and it is also assumed that an iron fence 4 is installed in the side of the road.

First, process for the data obtained in the first modulating section MO-1 will be explained. The process indicated in the flowchart of FIG. 3 is assumed to be driven immediately after completion of the first modulating section MO-1.

In the step 10, distance to the target and relative speed are obtained by implementing the measuring processes to the data obtained in the first modulating section (MO-1). A beat frequency obtained in this modulating section is indicated as $f_{b1}$ and distance value obtained here as $R_1$, relative speed as $V_1$.

Next, in the step 20, a beat frequency $f_{b2}$ assumed to be measured in the second modulating section (MO-2) on the basis of $R_1$, $V_1$ obtained in the step 10 can be computed from the equation (9).

$$f_{b2} = |2 \times V_1 \times f_{2\_1}/c| \qquad (9)$$

In the right side of the equation (9), $f_{2\_1}$ is used but difference is very small even when $f_{2\_2}$ is used and $f_{b2}$ can be approximated to the equal value.

Figure 6A:
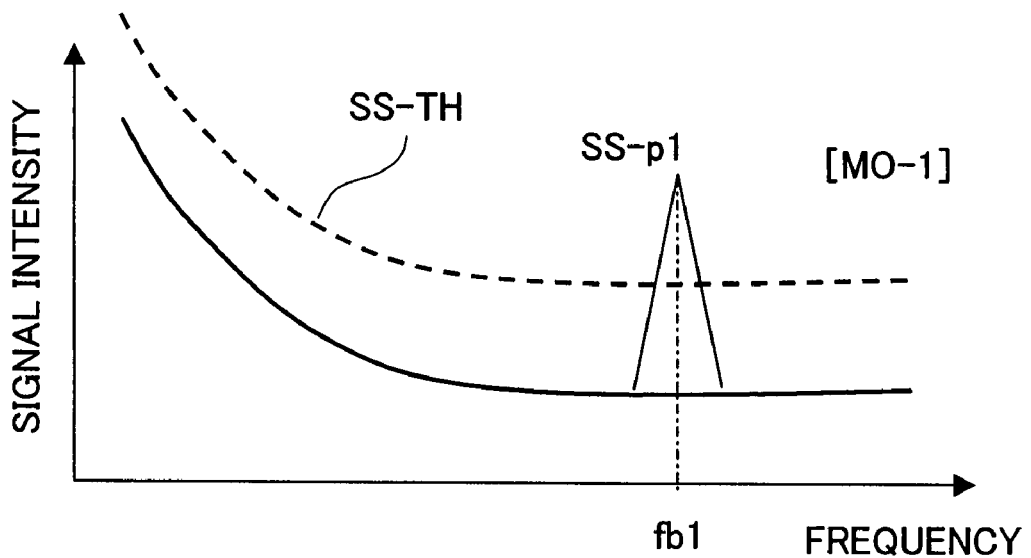
FIG. 6A shows an example of a frequency spectrum measured in the first modulating section according to the first embodiment.
Figure 6B:
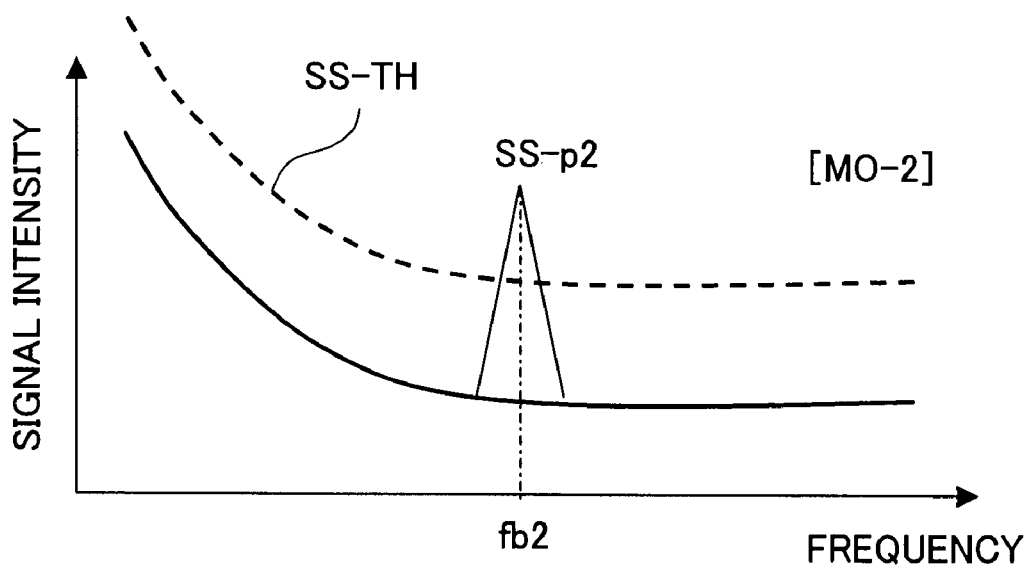
FIG. 6B shows an example of a frequency spectrum measured in the second modulating section according to the first embodiment.

Since the transmitting frequency has slope in the first modulating section, $f_{b1}$ is generally different from $f_{b2}$. For example, when a frequency spectrum is observed for the approaching target, it is indicated by a solid line in FIG. 6A in the first modulating section, while it is indicated by a solid line in FIG. 6B in the second modulating section. SS-TH indicated by a broken line in FIG. 6A and FIG. 6B is a threshold value for identifying appearance of a signal discriminated from noise. When there is a peak having signal intensity exceeding this threshold value, the signal having such peak is judged as the signal reflected from the target.

In the subsequent step 22, it is determined whether the deduced intermediate frequency value $f_{b2}$ is nearly 0 or not. In general, noise level is high at the frequency around 0. FIG. 5 shows such situation and a solid line indicates noise level. As the standard frequency value $f_{n0}$ for determining that the frequency is nearly 0, for example, an absolute value which is smaller by 10 times a frequency resolution is previously set. When the absolute value of the deduced frequency $f_{b2}$ is smaller than such frequency value $f_{n0}$, the frequency is determined to be nearly 0. When it is judged that $f_{b2}$ is nearly 0, possibility that the frequency corresponding to $f_{b2}$ in the second modulating section cannot be detected is considerably high. The reason is that a frequency peak which should inherently appear lies under noise level disabling observation thereof.

Namely, if such situation is generated, the target detected in the first modulating section cannot be detected in the second modulating section. Accordingly, since whether the measured $R_1, V_1$ are correct or not correct cannot be verified, the process goes to the step 26 without cancellation of data by tentatively considering that the measurement has been conducted correctly. The result of measurement is then outputted to the tracking processor.

An object having a relative speed V of 0 can be detected through the steps explained above (YES in the step 22, and step 26).

If it is judged that $f_{b2}$ is not nearly 0 in the step 22, the process goes to the step 24 to search whether there is a beat signal in the frequency $f_{b2}$ in the second modulating section that is a preceding step or a subsequent step of the first modulating section having obtained $R_1$ and $V_1$.

In the case where a beat signal in the frequency $f_{b2}$ is detected, $R_1$ and $V_1$ are judged as the correct measuring values. The reason is that since a measuring accuracy of beat frequency is high, when $f_{b2}$ is measured in the second modulating section, $V_1$ used for calculating $f_{b2}$ and moreover R1 used for calculating $R_1$ are considered correct. In this case, the process goes to the step 26 to output the results of measurement $R_1, V_1$ to the tracking processor.

Meanwhile, if the beat signal of frequency $f_{b2}$ is not detected in the adjacent second modulating section, the process is completed without transmission of data to the tracking processor, because the measured value $V_1$ and moreover $R_1$ used for calculation of $V_1$ are assumed to include errors.

It is possible here to prevent an output, to the tracking processor, of the measured data including a large error due to interference between beat frequency and the same object through the steps (NO in the step 22, and step 24) explained above.

Process contents to be driven immediately after completion of the first modulating section (MO-1) have been explained above.

Figure 3:
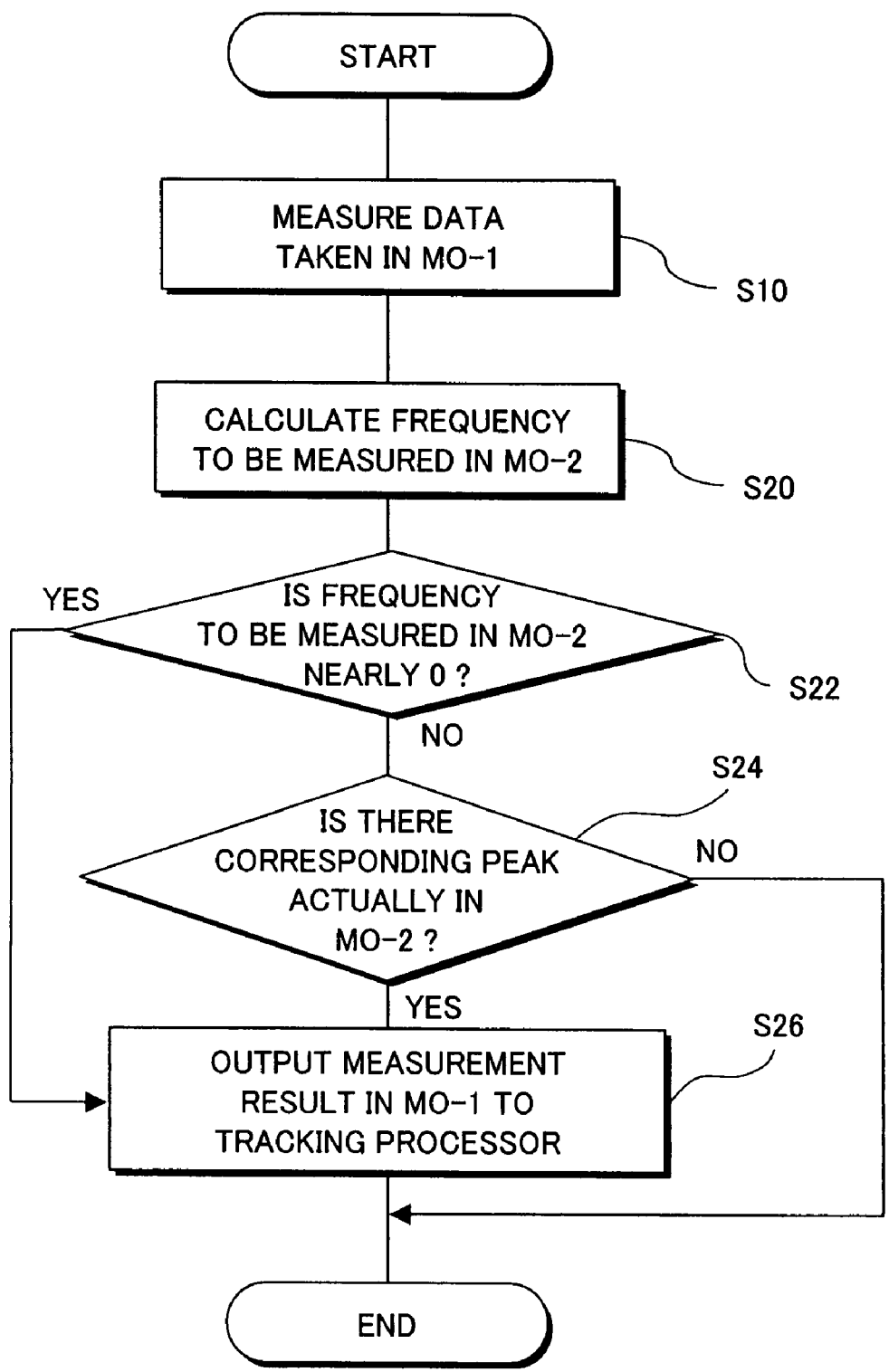
FIG. 3 is a flowchart showing processing contents corresponding to a first modulating section of a signal processor according to the first embodiment.
Figure 4:
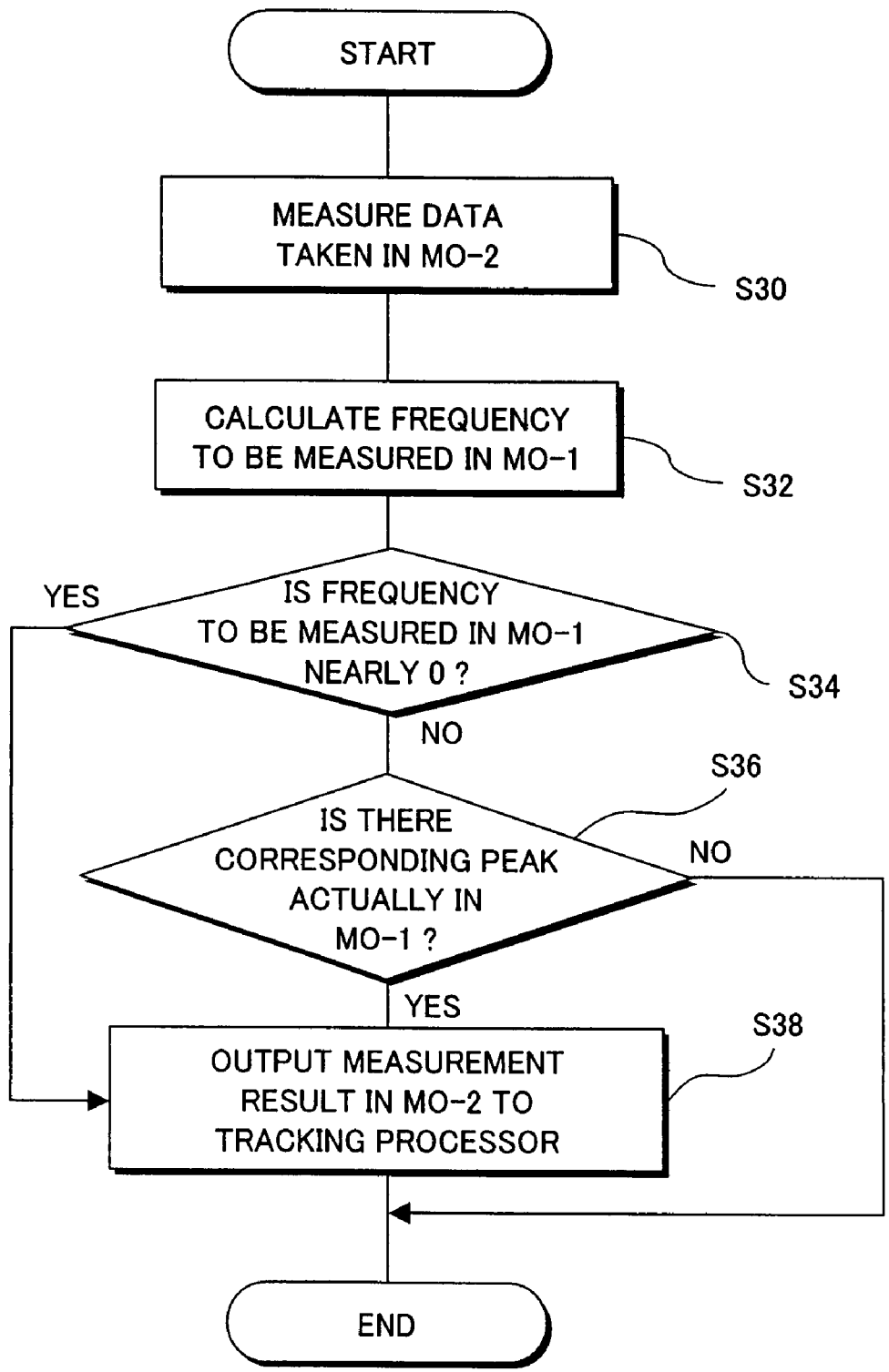
FIG. 4 is a flowchart showing processing contents corresponding to a second modulating section of the signal processor according to the first embodiment.
Figure 5:
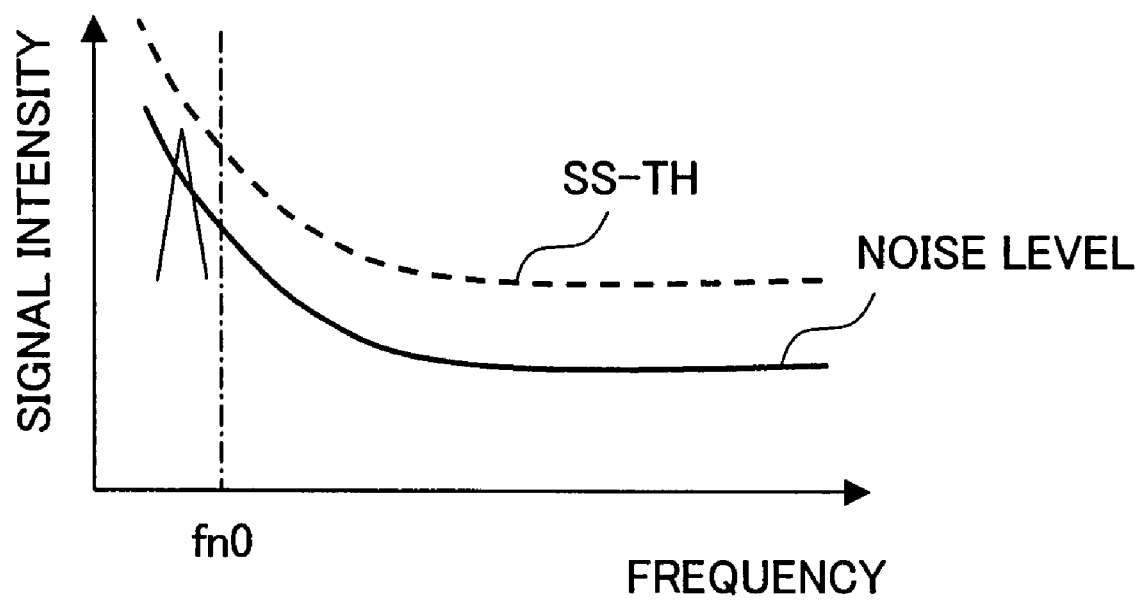
FIG. 5 shows a relationship between a beat signal and noise when a beat frequency is nearly 0.

Next, process contents driven immediately after completion of the second modulating section (MO-2) are shown in FIG. 4. In these process contents, contents corresponding to the first and second modulating sections are changed among the contents having been explained with reference to FIG. 3. First, in the step 30, measuring process is conducted for the data obtained in the second modulating section (MO-2) to obtain distance to the target and relative speed. Next, in the step 32, a beat frequency $f_{b1}$ deduced to be measured in the first modulating section (MO-1) is computed on the basis of $R_2, V_2$ obtained in the step 30. This beat frequency $f_{b1}$ can be calculated by the equation (10) in place of the equation (9).

$$f_{b1}=|2\times V_2\times f_{2\_1}/c+2\times R_2\times f'_{1\_1}/c| \quad (10)$$

The processes (steps 34 to 38) similar to that in FIG. 3 are conducted subsequently. An object that is slowly isolated can also be detected through the steps 30, 32, 34 (YES), and 38 in FIG. 4. Moreover, possibility for output of the measured value including a large error to the tracking processor can be remarkably lowered through the steps 30, 32, 34 (NO), and 36 in FIG. 4.

Figure 7:
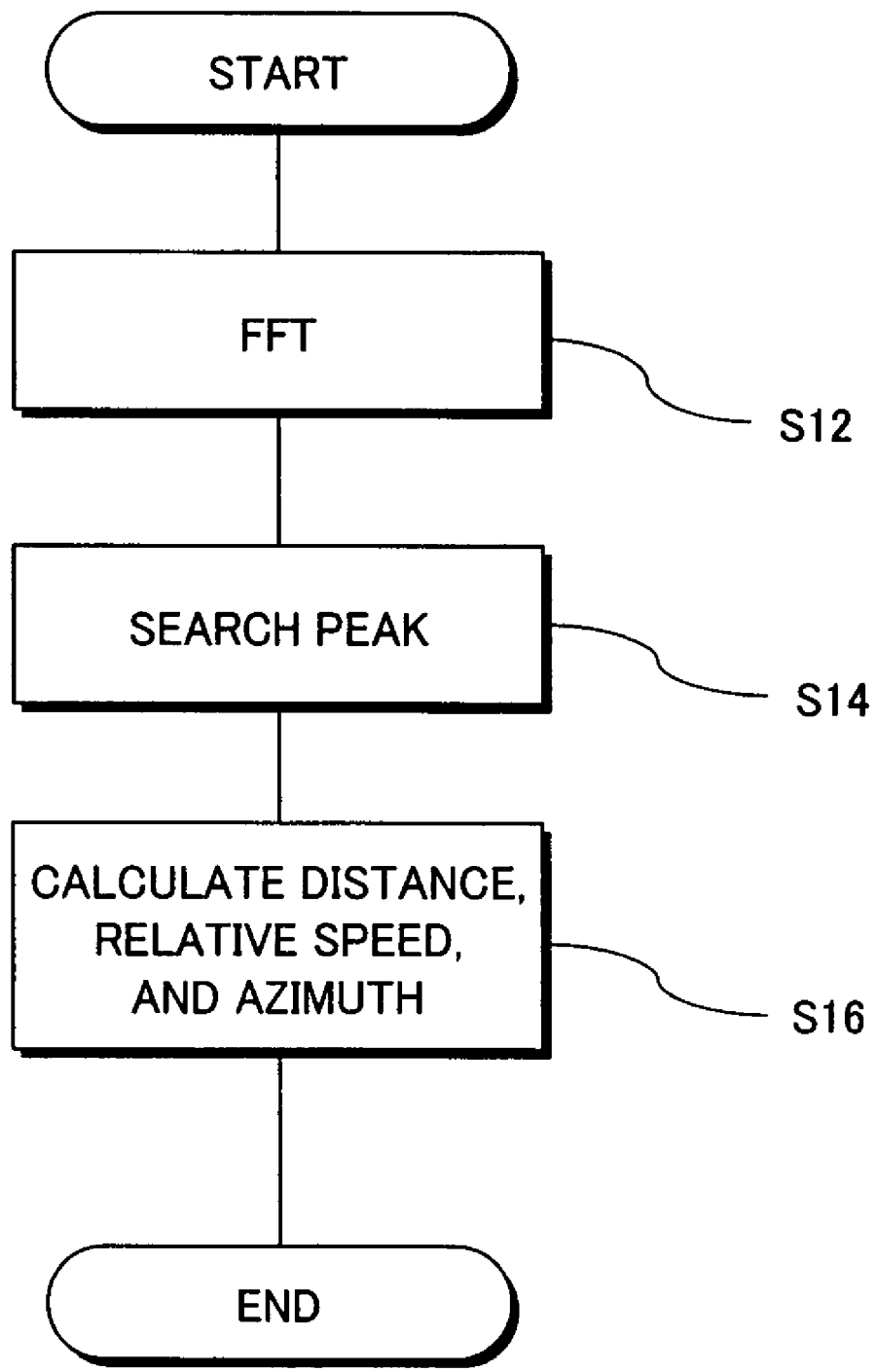
FIG. 7 is a flowchart showing detail processes for measuring position information of a detection target in FIG. 3 and FIG. 4.

Next, the process conducted in the measurement processing step 10 in FIG. 3 (similar to the measurement processing step 30 of FIG. 4) will be briefly explained with reference to FIG. 7. First, a frequency spectrum is obtained with the fast Fourier transformation (FFT) for the data obtained in each modulating section. In the case where the reflected wave of the target is received, the beat signals of this signal can be observed, for example, as indicated by SS-p1, SS-p2 in FIG. 6A and FIG. 6B as the peaks having a higher signal to noise power ratio (S/N). The peaks SS-p1, SS-p2 observed as explained above are extracted in the next step 14. For the peaks extracted here, distance and relative speed are calculated in accordance with the measurement principle explained above in the step 16.

The tracking processor 20 receives an output from the signal processor 19 to conduct the tracking process for the target. Moreover, this tracking processor 20 compensates the actually calculated present information on the basis of the present measuring information predicted from the detected target measurement information in the past. As the compensating means, a Kalman filter or an α-β filter which are used in the field of radar technology in the related art may be used.

Then, the effect of the present invention will be explained with reference to FIG. 9.

Figure 9A:
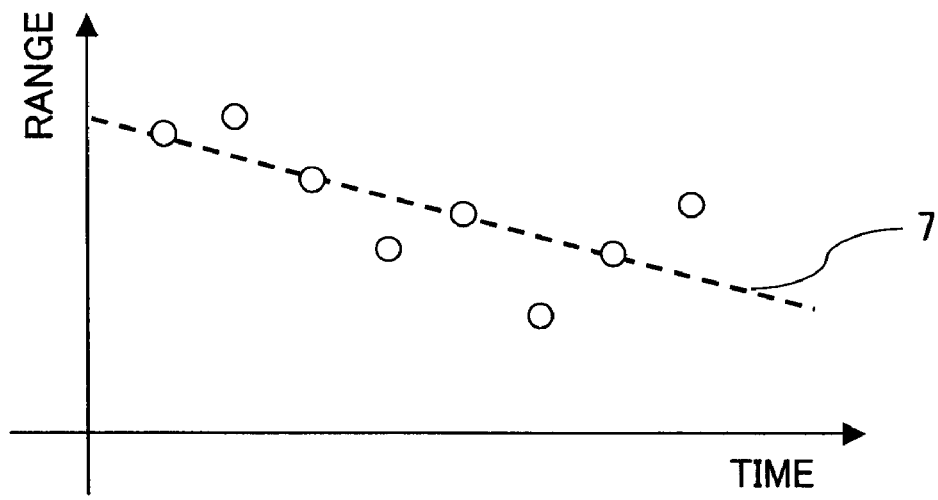
FIG. 9A is a diagram for explaining a radar output result when process contents of the signal processor according to the first embodiment of the present invention is not implemented.
Figure 18:
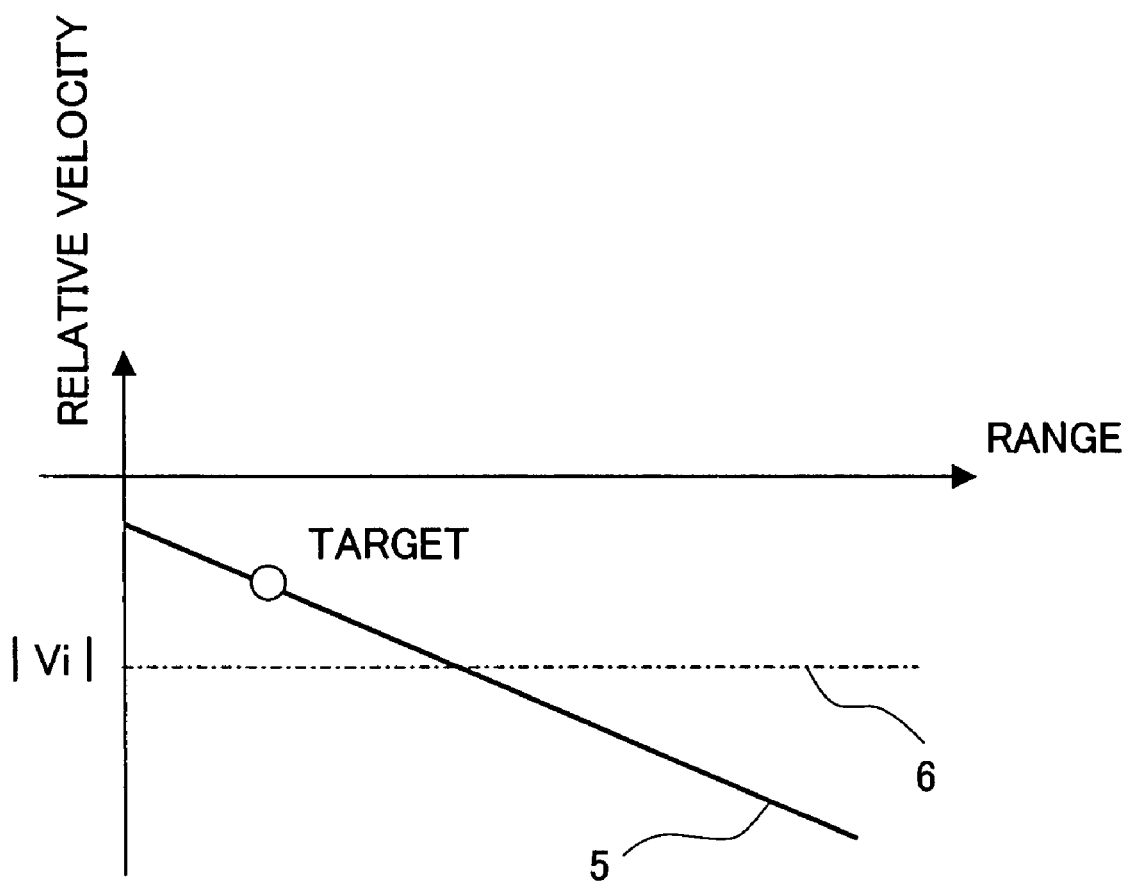
FIG. 18 shows a detecting method in two-frequency ramp system at a distance-relative speed plane.

A beat frequency of the receiving signal returned through reflection from the vehicle 3 shown in FIG. 8 is detected with the radar 1. If another target satisfying the conditions of distance and relative speed shown by the straight line 5 in the distance-relative speed plane exists as shown in FIG. 18, the beat frequency from such target is overlapped with the beat frequency by the vehicle 3 in the first modulating section (MO-1). Here, slope of the straight line 5 is determined from a slope of the transmitting frequency in the first modulating section (MO-1) for the time axis. If such situation is generated, distance values measured respectively in the first modulating section (MO-1) and the second modulating section (MO-2) may be outputted as shown in FIG. 9A. That is, since distance value measured in the first modulating section includes a larger error, the data having the distance value other than the true value 7 of the vehicle 3 is also outputted as shown in FIG. 9A.

Figure 9B:
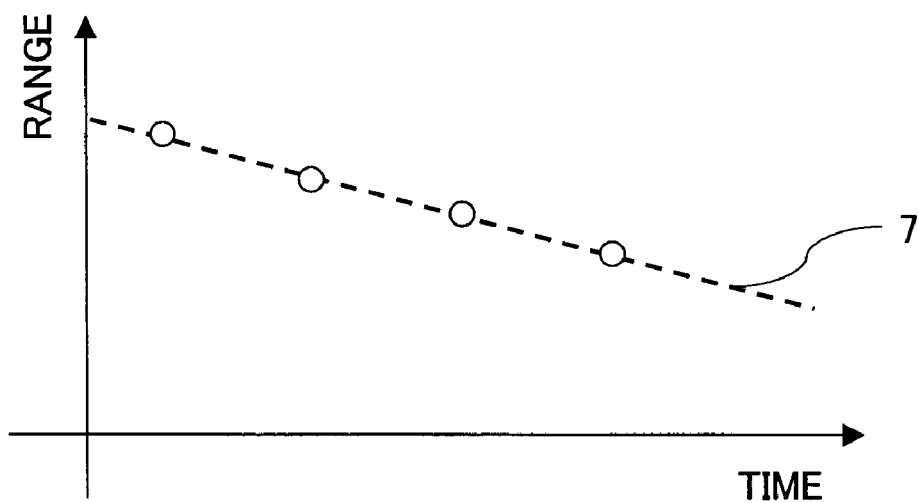
FIG. 9B is a diagram for explaining a radar output result when process contents of the signal processor according to the first embodiment of the present invention is implemented.

In this embodiment, both beat frequencies of the first modulating section and the second modulating section are detected for each unit modulating section (time interval T) and whether the measured data in one modulating section is correct or not is judged by information showing whether the frequency to be measured in the other modulating section becomes near to 0 or not and whether a peak exists or not. Accordingly, the measured data not satisfying the condition of the straight line 7 showing the true position is cancelled. Therefore, according to this embodiment of the present invention, only the distance value of the vehicle 3 can be outputted as shown in FIG. 9B.

According to the processes in this embodiment explained above, only highly reliable information can finally be outputted, because it can be prevented to output an erroneous result of measurement to the tracking process even when the measuring process has been conducted for only noise frequency, for example, in one modulating section and when a measuring error is generated because of presence of multiple targets having the identical beat frequency.

Moreover, calculations required for determination process of erroneously detected data and canceling process of data conducted usually by the tracking process may be reduced. Therefore, a threshold value for detecting the beat signal can be lowered without excessive increase in the processes of signals. As a result, detecting distance of target can be expanded because a very weak reflecting signal can be detected.

Second Embodiment

Figure 10:
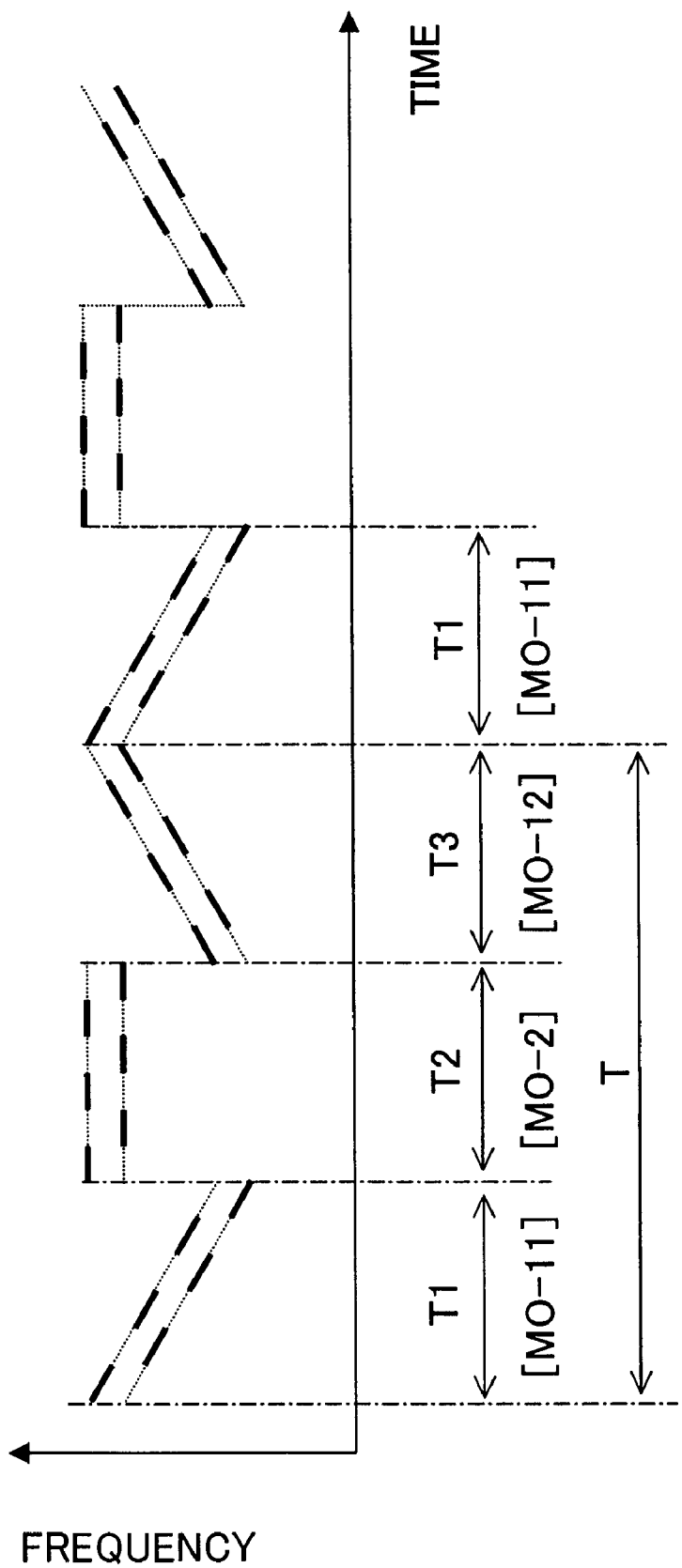
FIG. 10 shows a transmitting frequency pattern of a radar apparatus according to a second embodiment.
Figure 11:
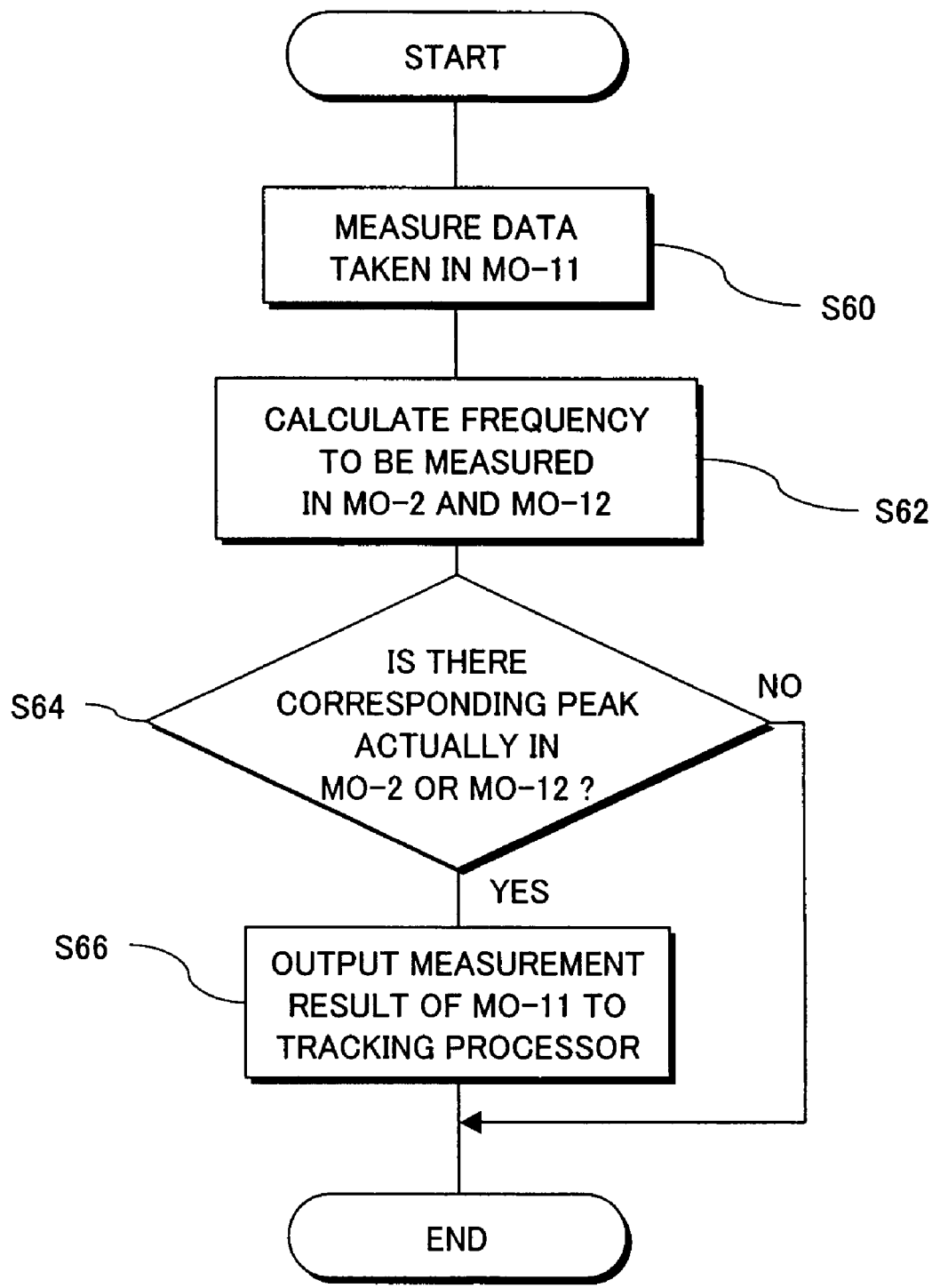
FIG. 11 is a flowchart showing process contents of the signal processor according to the second embodiment.

Next, a second embodiment of the present invention will be explained. The transmitting frequency pattern in this embodiment is shown in FIG. 10 and a flowchart of process is shown in FIG. 11. In this embodiment, the first modulating section is formed of a couple (plurality) of sub-modulating sections (MO-11), (MO-12) having a couple of frequency slopes having the inverted signs in the combination of the first modulating section (MO-1) and the second modulating section (MO-2) explained in the first embodiment.

In the first embodiment, whether data is correct or not correct has been verified using the result of measurement in a couple of modulating sections, but in this second embodiment, results of measurement in three modulating sections are used for verification of data.

A flowchart of an example of signal process is shown in FIG. 11. This process is driven immediately after completion of the first sub-modulating section (MO-11) in the first modulating section.

Here, it is assumed that distance $R_1$ and relative speed $V_1$ are measured in the first sub-modulating section of the first modulating section at a certain time (step 60). Then the beat frequency $f_{b2}$ assumed to be measured in the second modulating section using the values of R1 and V1 is calculated from the equation (9) and moreover the beat frequency $f_{b3}$ assumed to be measured in the second sub-modulating section of the first modulating section is also calculated with the equation (11) in the step 62.

$$f_{b3} = |2 \times V_1 \times f_{2\_1}/c - 2 \times R_2 \times f'_{1\_1}/c| \quad (11)$$

Subsequently, whether there are beat signals of frequencies $f_{b2}$, $f_{b3}$ in the second modulating section and the second sub-modulating section of the first modulating section one or two sections before the first sub-modulating section of the first modulating section having measured R1 and V1 in the step 64 is checked.

When at least one or more beat frequencies $f_{b2}$, $f_{b3}$ are detected, the measured values $R_1$, $V_1$ in the first sub-modulating section of the first modulating section are judged correct, because the values $R_1$, $V_1$ used for calculation of $f_{b2}$ and $f_{b3}$ are considered as the correct values when these $f_{b2}$ and $f_{b3}$ are measured in the modulating section since the measuring accuracy of the beat frequency is high. In this case, the process goes to the step 66 and the result of measurement is outputted to the tracking processor. On the other hand, if the beat signals of frequencies $f_{b2}$, $f_{b3}$ are not detected in the adjacent second modulating section and in the second sub-modulating section of the first modulating section, the process is completed without transmission of data to the tracking processor because the measured values is likely considered to include an error.

In the case of the first embodiment, if $f_{b2}$ is nearly 0, correctness of $R_1$, $V_1$ values cannot be verified. However, since $f_{b2}$ and $f_{b3}$ do not become 0 simultaneously in this embodiment, when $R_1$, $V_1$ are measured correctly, an estimated beat frequency exists at least in any of the modulating sections and data can be assured to be correct.

With the processes explained above, reliability of data can further be improved in comparison with the first embodiment.

Third Embodiment

Figure 12:
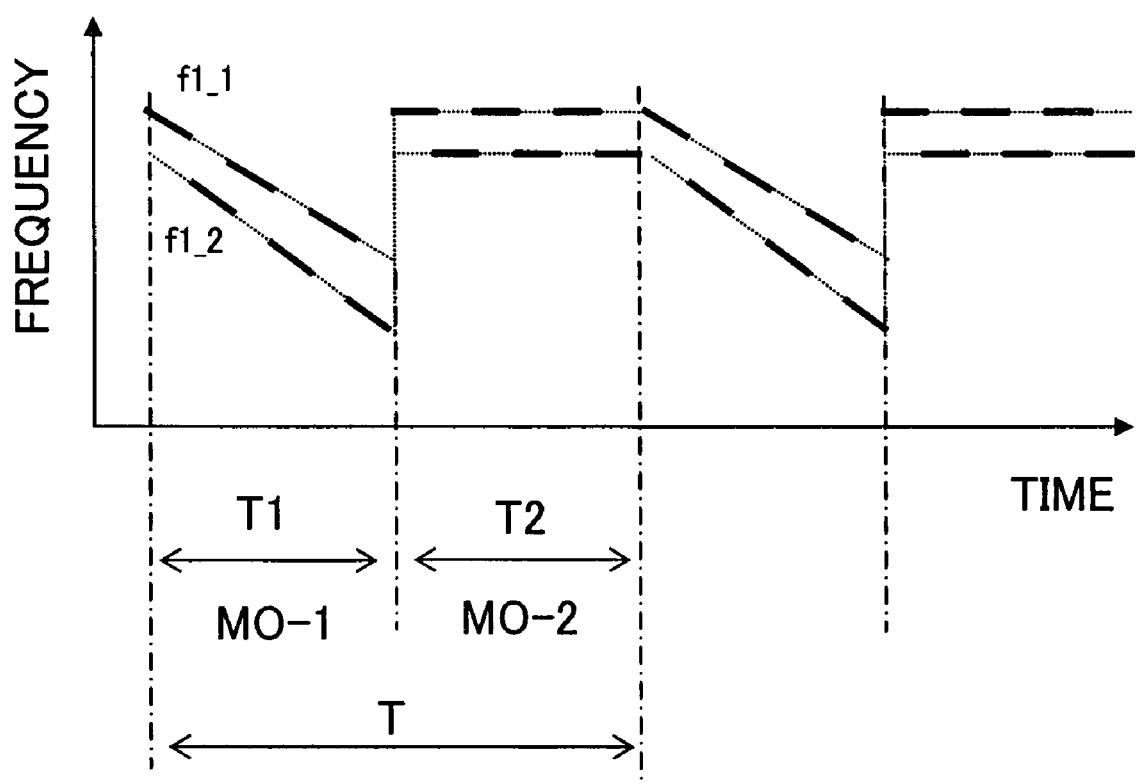
FIG. 12 shows a transmitting frequency pattern of a radar apparatus according to a third embodiment.

Next, a third embodiment will be explained. The transmitting frequency pattern in this embodiment is shown in FIG. 12. This example is characterized in that slopes to the time axis of a couple of sweep frequency straight lines transmitted with switching transition in the first modulating section are different. Process flow is basically identical to that in FIG. 4 and FIG. 7.

A couple of frequency spectra are measured in accordance with the sweep frequency straight lines having a couple of slopes. In this case, a beat signal of a target is measured to have different frequency.

It is assumed that distance $R_2$ and relative speed $V_2$ are measured at a certain time. The beat frequency to be measured in the first modulating section can be indicated by the equation (12) using such values.

$$f_{b1\_1} = |2 \times V_2 \times f_{1\_1}/c - 2 \times R_2 \times f'hd\ 1\_1/c|$$

$$f_{b1\_2} = |2 \times V_2 \times f_{1\_2}/c - 2 \times R_2 \times f'_{1\_2}/c| \quad (12)$$

Here, $f'_{1\_1}$, $f'_{1\_2}$ indicate slopes of a couple of sweep frequency straight lines in the first modulating section.

Since there are two beat frequencies to be measured, even if any of $f_{b1\_1}$, $f_{b1\_2}$ is nearly 0, another beat frequency can surely be detected as in the case of the second embodiment. Therefore, when $R_2$, $V_2$ are correct measured values, the estimated beat frequency can be detected at least in one or more spectra of a couple of frequency spectra obtained in the first modulating section and thereby correctness of data can be ensured.

With the processes explained above, reliability of data can further be improved in comparison with the first embodiment.

Fourth Embodiment

Figure 13:
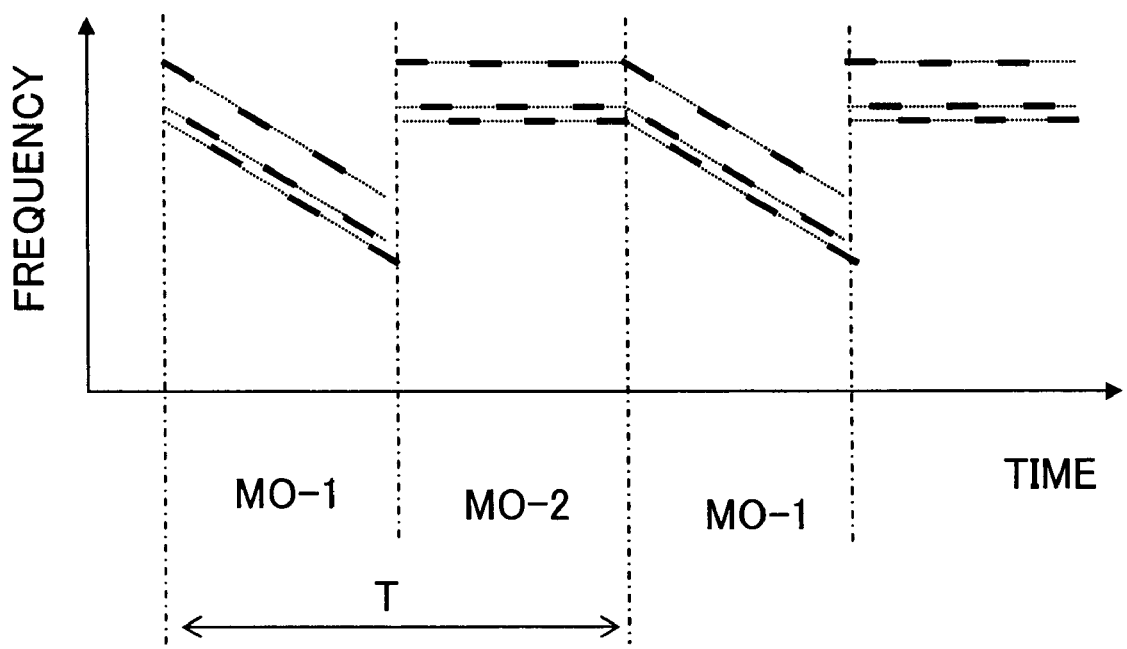
FIG. 13 shows a transmitting frequency pattern of a radar apparatus according to a fourth embodiment.

Next, a fourth embodiment will be explained. The transmitting frequency pattern in this embodiment is shown in FIG. 13. A couple of frequencies have been transmitted with the switching transition in the time interval ΔT in the first to third embodiments. However, in this embodiment, a third frequency is further used to transmit three frequencies in the first modulating section (MO-1) and second modulating section (MO-2) with the switching transition in the time interval ΔT. Process flowchart is basically identical to that in FIG. 3 and FIG. 4. However, a new process explained below is added in the step 10 and the step 30.

In the system for measuring distance to the target using a phase difference like two-frequency CW system, distance measurement is folded when the phase has exceeded π(radian) and a value smaller than the actual value may be calculated in some cases.

Therefore, in this embodiment, the condition that when the distance measured using $f_1$ and $f_2$ is identical to the distance value measured using $f_1$ and $f_3$, such distance value is used as the measured value in the first modulating section is added to the step 10 (or step 30) in FIG. 3.

With this condition, a couple of measured values obtained with the method are not matched with each other when folding of distance measurement is generated and thereby such measured values cannot be used. As a result, possibility for output of data including an error may be reduced.

With the process explained above, calculation of the value smaller than the actual distance due to folding of distance measurement may be eliminated. Therefore, reliability of data can further be improved in comparison with the first embodiment.

Fifth Embodiment

Figure 14:
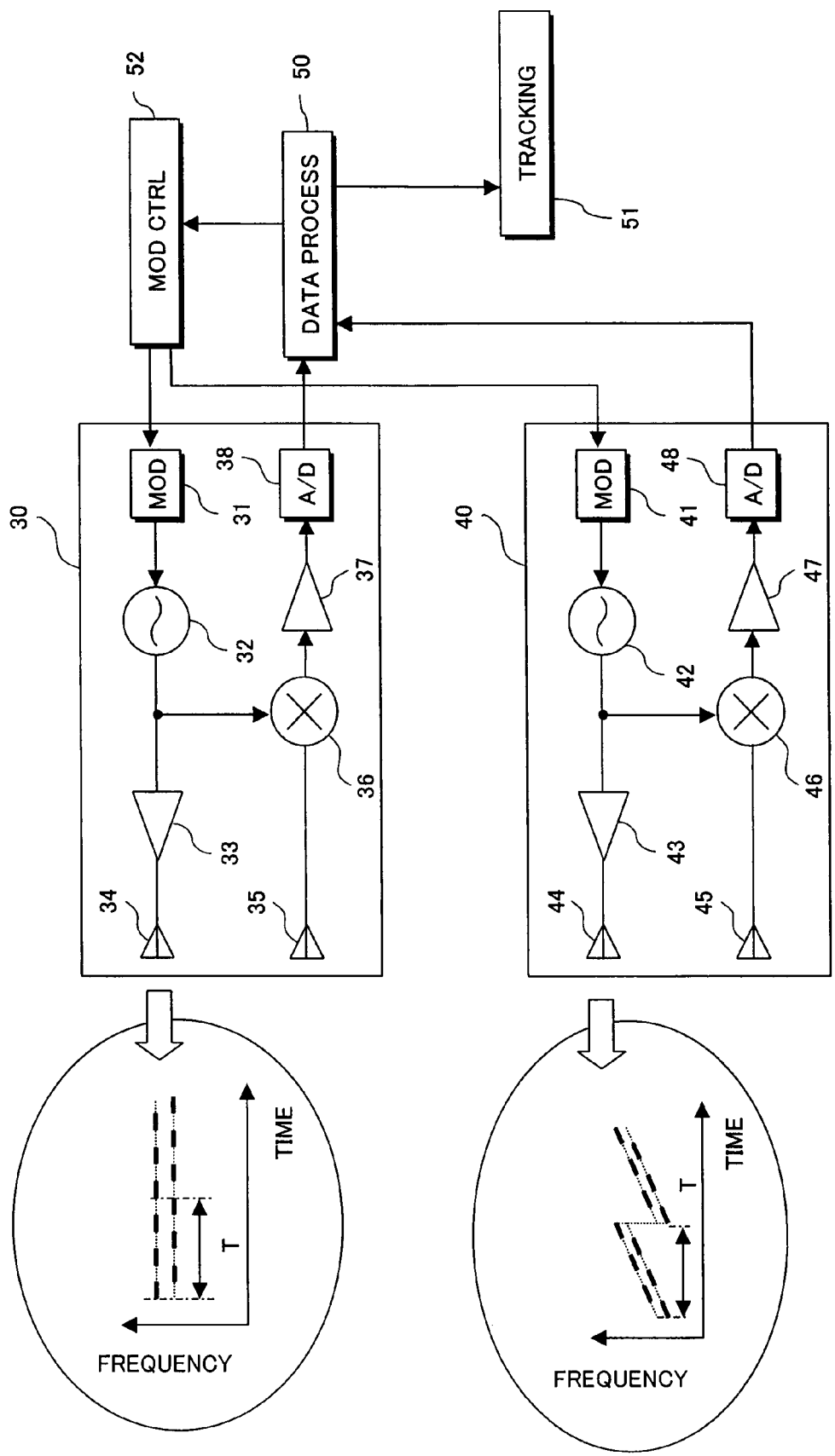
FIG. 14 is a block diagram showing a circuit structure of a radar apparatus according to a fifth embodiment.
Figure 15:
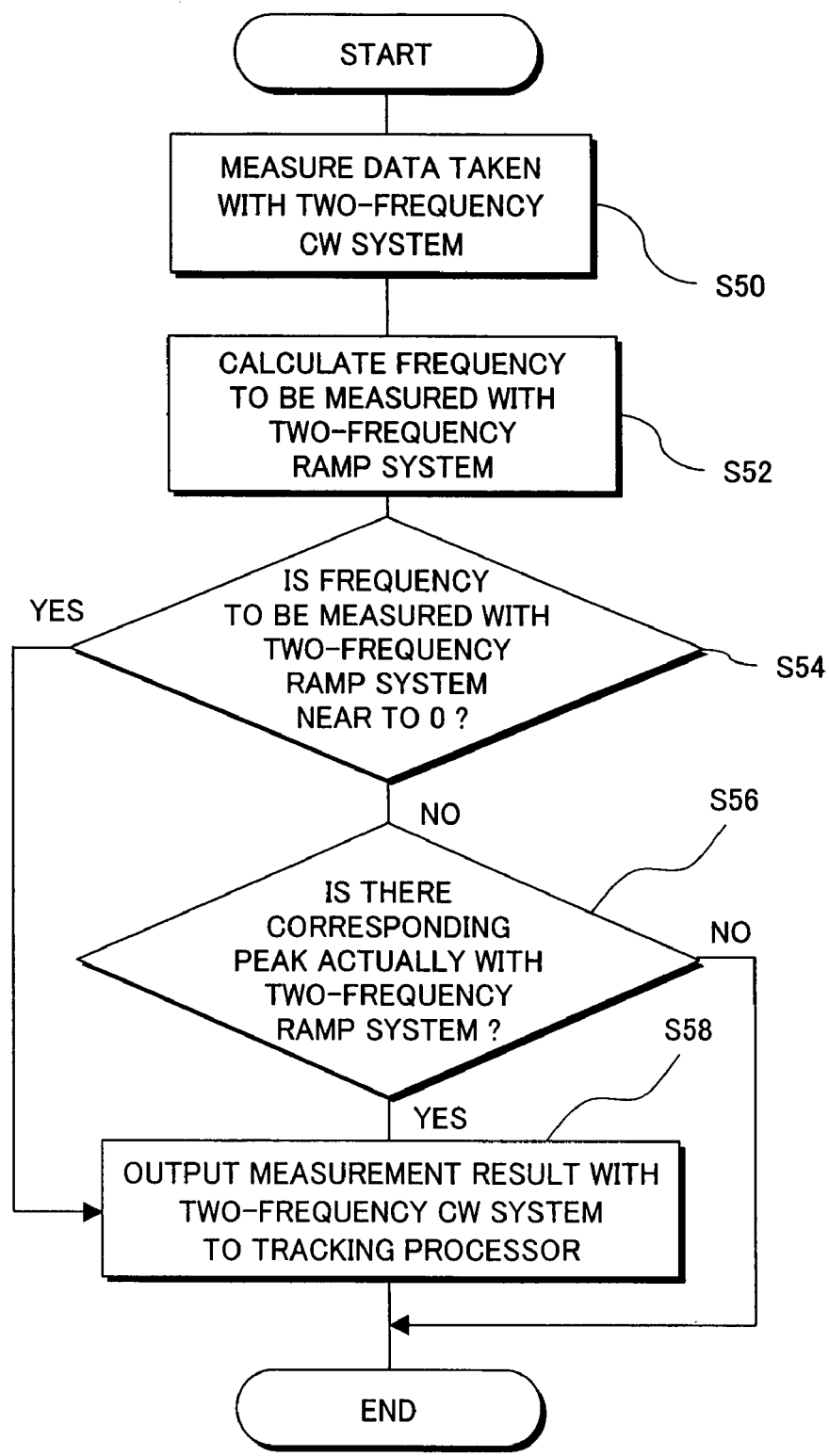
FIG. 15 is a flowchart showing process contents of the signal processor according to the fifth embodiment.

Next, a fifth embodiment will be explained. FIG. 14 shows a block diagram of the radar apparatus to realize this embodiment. Process flowchart is shown in FIG. 15. The radar apparatus of this embodiment utilizes two radars. One radar transmits the radio wave in accordance with the transmitting frequency pattern of two-frequency CW system, while the other radar transmits the radio wave in accordance with the transmitting frequency pattern of two-frequency ramp system. A high-frequency circuit 30 of two-frequency CW system includes a modulator 31, an oscillator 32, a power amplifier 33, a transmitting antenna 34, a receiving antenna 35, a mixer circuit 36, a power amplifier 37, and an A/D converter 38. While, a high-frequency circuit 40 of the radar apparatus of two-frequency ramp system includes a modulator 41, an oscillator 42, a power amplifier 43, a transmitting antenna 44, a receiving antenna 45, a mixer circuit 46, a power amplifier 47, and an A/D converter 48. A receiving signal processor 50 common to both radars (30, 40), a tracking processor 51 and a modulation controller 52 are also provided.

In the first to fourth embodiments, results of measurements in the section having frequency slope and the section having no frequency slope have been alternately obtained. However, in this embodiment, since the high-frequency circuit 30 of two-frequency CW radar apparatus and the high-frequency circuit 40 of the radar apparatus of two-frequency ramp system operate simultaneously, measurement results can be obtained simultaneously (steps 50, 52 in FIG. 15). In the signal processor 50, only when there is no inconsistency in the data obtained simultaneously, the measurement result is outputted to the tracking process (steps 54, 56, 58 in FIG. 15).

This embodiment enables simultaneous measurements with a couple of modulation patterns, even if a relative speed of the target changes considerably with passage of time, a difference is not easily generated between both measurement results and thereby reliability can further be improved.

Six Embodiment

Figure 16:
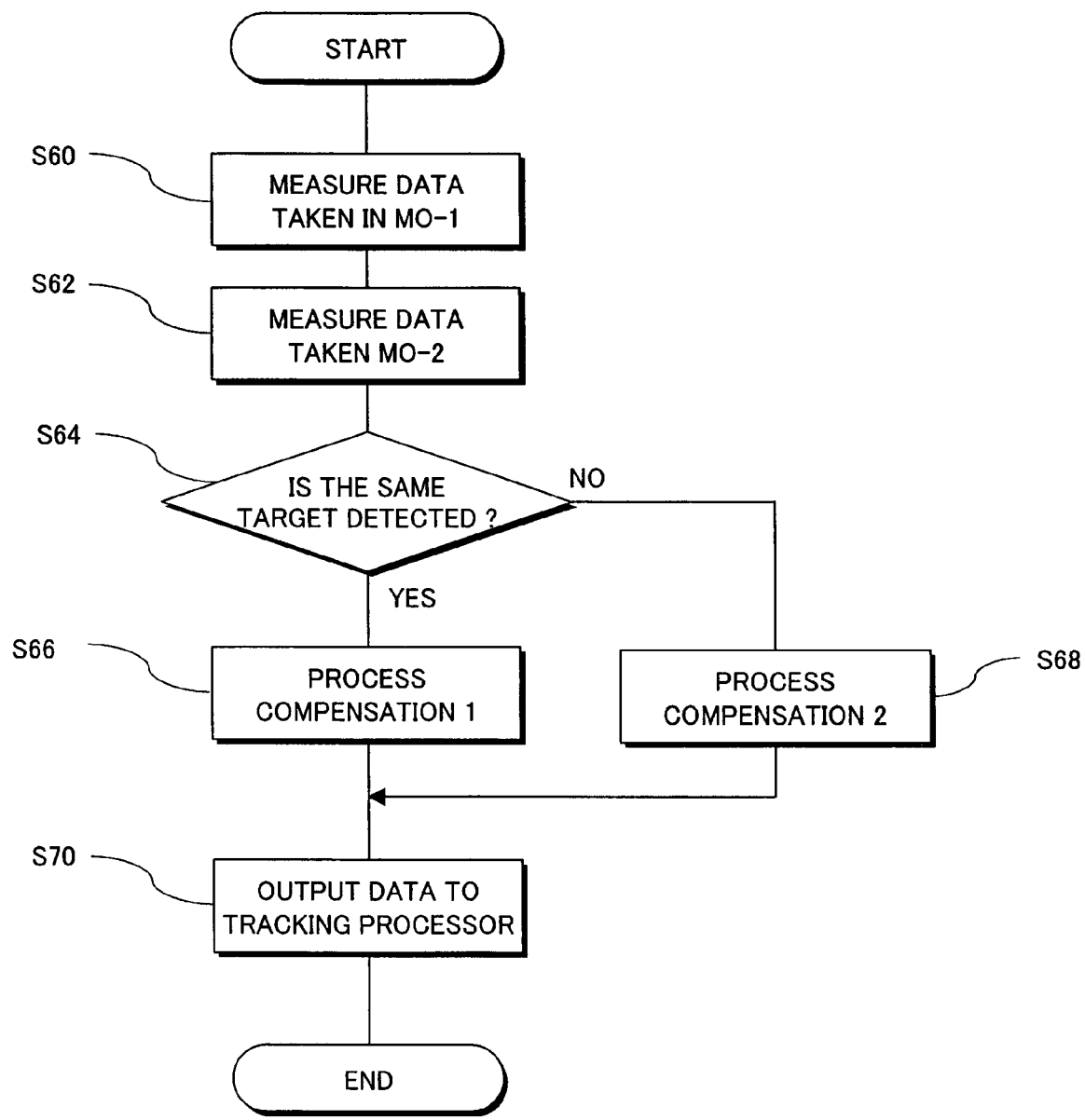
FIG. 16 is a flowchart showing process contents of a signal processor according to a sixth embodiment.
Figure 17:
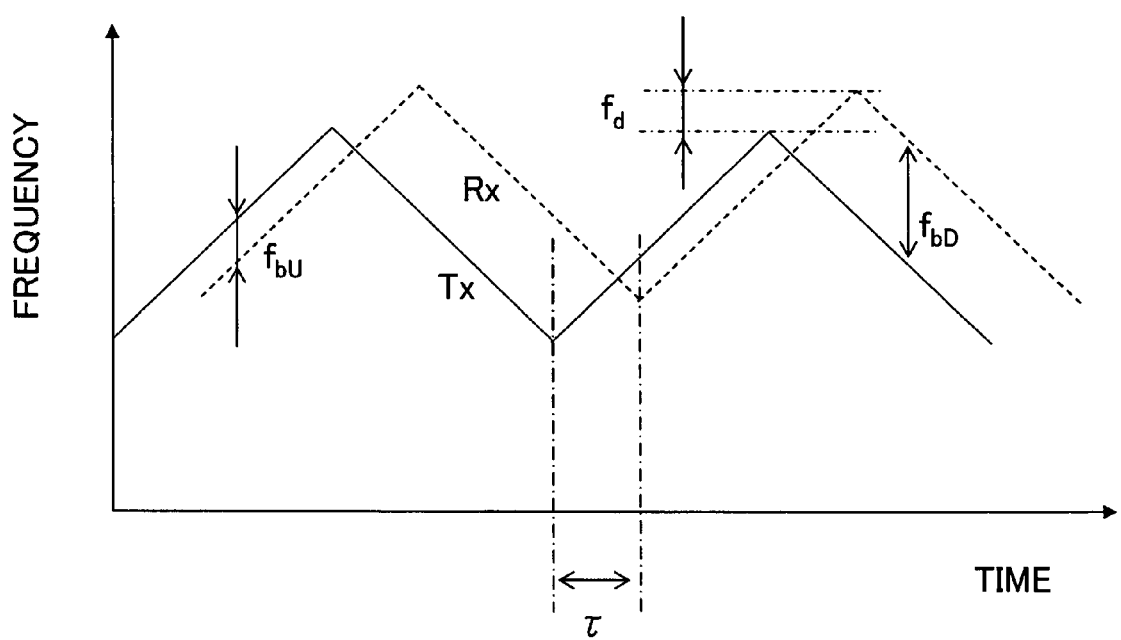
FIG. 17 shows a relationship between a transmitting frequency pattern and a receiving wave in the FMCW system.

Next, a six embodiment of the present invention will be explained. This embodiment is different from the first embodiment in the process contents in the signal processor 19. Processes are executed in accordance with the flowchart shown in FIG. 16 instead of the process flowcharts shown in FIG. 3 and FIG. 4. The process flow is driven immediately after completion of the second modulating section, but may also be driven immediately after completion of the first modulating section. In the latter case, step 60 in the flowchart is replaced with the step 62.

First, in the step 60, distance to the target and relative speed are obtained by implementing the measuring process to the data sampled in the first modulating section. The distance obtained here is defined as $R_1$, while relative speed value is defined as $V_1$.

Next, distance to the target and relative speed are obtained in the step 62 by implementing the measuring process to the data sampled in the second modulating section. The distance obtained here is defined as $R_2$ and relative speed value as $V_2$.

In the subsequent step 64, whether the measured values are based on the identical target is determined by comparing these values with the measured values obtained in the steps 60, 62. For example, if the measured values satisfying simultaneously the two equations (13) are attained, it is determined the identical target has been detected in the two modulating sections.

$$(R_1-R_2)<R_e$$

$$(V_1-V_2)<V_e \qquad (13)$$

Here, Re and Ve are preset threshold values.

When it is determined in the step 64 that the identical target has been detected, a compensating process to calculate a mean value of the values measured in the first and second modulating sections is conducted in the compensating process 1 in the step 66 and an output is given to the tracking processor in the subsequent step 70.

Meanwhile, if it is determined that the identical target is not detected in the step 64, the process goes to the compensating process 2 of the step 68. In this step, only the measurement result may be cancelled or if there is the measured data that can be determined correct, for example, on the basis of history information in the past, such data may be held.

According to the processes explained above, even when the measuring process has been implemented to only noise frequency, for example, in one modulating section or when a measuring error is generated due to presence of a plurality of targets of the identical beat frequency, it may be prevented that such erroneous measurement result is outputted to the tracking processor. Therefore, only the highly reliable information can finally be outputted. In addition, the present invention can provide an advantage that implementation of the signal processing program on the radar apparatus can be realized easily in comparison with the first embodiment because the measured data of the first modulating section and the second modulating section can be processed simultaneously. Moreover, measuring accuracy of the relative speed can be improved by utilizing the measured value in the second modulating section as the relative speed of the target in the compensating process of the step 66. The reason is that since the transmitting frequency of the second modulating section has no frequency slope, it is less influenced by temperature variation than that in the first modulating section.

What is claimed is:

1. A radar apparatus comprising:
    a signal generating unit;
    a transmitting unit;
    a receiving unit; and
    a receiving signal processing unit,
    wherein a transmitting signal generated with the signal generating unit and radiated from the transmitting unit including, within a unit modulating section, a first modulating section on the time axis for transmitting a radio wave in accordance with at least a couple of sweep frequency straight lines having frequency slopes for the time axis with periodical switching transition, and a second modulating section on the time axis for transmitting the radio wave in accordance with at least a couple of sweep frequency straight lines having no frequency slope for the time axis with the periodical switching transition, and wherein the signal processing unit has a function for obtaining at least one of distance to a target or a relative speed by processing a reflected wave of the transmitting signal reflected by the target and received with the receiving unit.

2. The radar apparatus according to claim 1, wherein the receiving signal processing unit has a function for determining whether detection is correct or not by comparing the reflected wave including the first modulating section and the second modulating section with measured values of the one modulating section and the other modulating section.

3. The radar apparatus according to claim 1, wherein the receiving signal processing unit has a function for calculating an intermediate frequency to be measured in one modulating section from distance to the target and relative speed measured in the other section among a couple of sections within the unit modulating section on the time axis, and for determining that measured distance and relative speed are correct when a peak of the actually measured intermediate frequency exists in the calculated intermediate frequency.

4. The radar apparatus according to claim 1, wherein the receiving signal processing unit has a function for calculating the intermediate frequency to be measured in the one modulating section from distance to the target and relative speed measured in the other section among a couple of sections within the unit modulating section on the time axis, and eliminating a process to determine whether the measured distance and speed are correct or not when the calculated frequency value becomes near to 0.

5. The radar apparatus according to claim 1, wherein the first modulating section includes two or more sub-sections on the time axis for transmitting a radio wave in accordance with at least a couple of sweep frequency straight line having different frequency slopes for the time axis with periodical switching transition.

6. The radar apparatus according to claim 5, wherein the receiving signal processing unit has a function for calculating the intermediate frequency to be measured in the remaining sections within the unit modulating section from distance to the target and relative speed measured in any section among the sub-section of the first modulating section, and the second modulating section and for determining that the measured distance and relative speed are correct when an intermediate frequency peak exists in the calculated values in at least one or more sections of the remaining sections.

7. The radar apparatus according to claim 1, wherein slopes for time axis of at least a couple of sweep frequency straight lines in the first modulating section are different from each other.

8. The radar apparatus according to claim 7, wherein the receiving signal processing unit has a function for calculating, for each frequency slope, the intermediate frequency to be measured in the first modulating section from distance to the target and relative speed measured in the second modulating section, and for determining that the measured distance and relative speed are correct when the intermediate frequency peak actually exists in at least one or more calculated values.

9. The radar apparatus according to claim 1, wherein there are three sweep frequency straight lines for transmission with switching transition in each of the first and the second modulating sections.

10. The radar apparatus according to claim 9, wherein the receiving signal processing unit has a function for measuring distance to detection target and relative speed with two frequencies different from the three frequencies and measuring distance to detection target and relative speed with two frequencies different from the two frequencies.

11. The radar apparatus according to claim 10, wherein the receiving signal processing unit utilizes, when two sets of the measured distance and the relative speed are equal, such values as the measured values in the relevant modulating section.

12. The radar apparatus according to claim 1, further comprising an analog circuit unit, wherein the analog circuit unit including as a transmitting system, a signal generating unit further including a modulator and an oscillator, and a transmitting unit further including a power amplifier and a transmitting antenna, and includes, as a receiving system, a receiving unit further including a receiving antenna, a mixer, a power amplifier, and an A/D converter, and wherein the modulator is capable of outputting, to the oscillator, a modulating signal of a frequency pattern including the first modulating section and the second modulating section within the unit modulating section.

13. The radar apparatus according to claim 12, wherein the receiving signal processing unit has a speed and distance calculating function for implementing process of a digital signal based on the predetermined function equation for the signal received with the receiving unit and subjected to digital conversion with the A/D converter, and obtaining a relative speed between the radar and the target and distance to the target.

14. A radar apparatus, comprising:
a signal generating unit;
a transmitting unit;
a receiving unit; and
a receiving signal processing unit,
wherein a transmitting signal generated with the signal generating unit and radiated from the transmitting unit including, within a unit modulating section, a first transmitting signal for transmitting a radio wave in accordance with at least a couple of sweep frequency straight lines having frequency slopes for the time axis with periodical switching transition, and a second transmitting signal for transmitting the radio wave in accordance with at least a couple of sweep frequency straight lines having no frequency slope for the time axis with periodical switching transition, and
wherein the receiving signal processing unit has a function for determining whether detection is correct or not by comparing a measured value calculated using a receiving signal in the first modulating section with a measured value calculated using a receiving signal in the second modulating section.

15. The radar apparatus according to claim 14, wherein the transmitting signal radiated from the transmitting unit includes the first modulating section for transmitting the first transmitting signal and the second modulating section for transmitting the second transmitting signal with periodical switching transition, and
wherein the receiving signal processing unit has a function for determining that the measured values are correct when at least one or more of distance to the target and relative speed measured in any one of sections among those on the two time axes is equal to distance and relative speed measured in the other section within the unit modulating section.

16. The radar apparatus according to claim 14,
wherein the transmitting signal radiated from the transmitting unit is the signal for transmitting the radio wave having at least two frequencies with periodical switching transition and for simultaneously transmitting the radio wave in accordance with at least a couple of sweep frequency straight lines having frequency slopes for the time axis with periodical switching transition, and
wherein the receiving signal processing unit has a function for determining whether detection is correct or not with comparison of the results which is measured at the same time on the two modulation systems.

17. A signal processing method for a radar apparatus to transmit a transmitting signal from a transmitting unit and receive a signal that has been scattered from the transmitting signal with a target to be detected with a receiving unit in order to detect distance or speed of the target with a receiving signal processing unit, the signal processing method comprising the steps of:
radiating the transmitting signal including, within a unit modulating section, a first modulating section on the time axis for transmitting, from the transmitting unit, a radio wave in accordance with at least a couple of sweep frequency straight lines having frequency slopes for the time axis with periodical switching transition, and a second modulating section on the time axis for transmitting a radio wave in accordance with at least a couple of sweep frequency straight lines having no frequency slope for the time axis; and
obtaining, with the signal processing unit, at least any one of distance to the target and relative speed by processing a reflected signal of the transmitting signal reflected by the target and received with the receiving unit.

18. The signal processing method according to claim 17, further comprising the step of:
verifying whether detection is correct or not by comparing, in the receiving signal processing unit, a measured value in the one modulating section with a measured value in the other modulating section within the unit modulating section for the reflected wave including the first modulating section and the second modulating section.

19. The signal processing method according to claim 17, further comprising the steps of:
calculating an intermediate frequency to be measured in the one section among two sections from the distance to target and relative speed measured in the other section within the unit modulating section; and
determining, in the receiving signal processing unit, that measured distance and relative speed are correct when the actually measured intermediate frequency peak exists within the calculated intermediate frequency.

* * * * *